United States Patent [19]

Rodler

[11] 3,886,931

[45] June 3, 1975

[54] ELECTRODIAGNOSTIC APPARATUS

[76] Inventor: Hans Rodler, Karntnerstrasse 161, 8053 Graz-Neuhart, Austria

[22] Filed: Dec. 1, 1972

[21] Appl. No.: 311,263

[30] Foreign Application Priority Data
Dec. 1, 1971 Austria .............................. 10360/71

[52] U.S. Cl. .............................. 128/2.1 R; 128/420
[51] Int. Cl. .............................................. A61b 5/05
[58] Field of Search ............. 128/2.1 R, 419 R, 420, 128/421, 422

[56] References Cited
UNITED STATES PATENTS

| | | | |
|---|---|---|---|
| 1,514,746 | 11/1924 | Wappler | 128/423 |
| 2,308,933 | 1/1943 | Raesler | 128/2.1 R |
| 2,808,826 | 10/1957 | Reiner et al. | 128/2.1 R |
| 3,294,092 | 12/1966 | Landauer | 128/420 |
| 3,727,616 | 4/1973 | Lenzkes | 128/422 |

*Primary Examiner*—William E. Kamm
*Attorney, Agent, or Firm*—Ernest G. Montague; Karl F. Ross; Herbert Dubno

[57] ABSTRACT

An electrodiagnostic apparatus comprises an adjustable constant-current generator in the form of an operational amplifier selectively energizable in various modes, i.e. with sawtooth waves, square waves, direct current and manually generated pulses. The magnitude of this current is adjusted with the aid of a potentiometer whose slider is coupled with an indicator which in a preferred embodiment has the form of a rotatable setting disk sweeping over a fixed logarithmic current scale. A coacting disk coaxial with the setting disk has a marker which can be aligned with a marker on the setting disk after the same has been adjusted to a current intensity representing the accommodation threshold of a patient tested in the sawtooth-wave mode; upon a switchover to square-wave mode and readjustment of the setting disk to give a rheobase reading, a window in the coacting disk exposes a reading of the corresponding accommodation quotient on the underlying setting disk. Instead of a single potentiometer, two potentiometers may be used whose sliders are respectively coupled with the setting disk and with the coacting disk, these sliders being alternately connectable to an input of the operational amplifier for energizing same in either the sawtooth-wave or the square-wave mode.

7 Claims, 3 Drawing Figures

PATENTED JUN 3 1975　　3,886,931

ELECTRODIAGNOSTIC APPARATUS

My present invention relates to an instrument for electrodiagnosis in which currents can be preselected independent of load resistance with the aid of electric control means coupled with a numerical indicator.

In conventional electrodiagnostic apparatus, test currents are passed through the body of a patient and read off from a measuring instrument.

The currents may have the form of brief pulses which are produced one after the other by means of a manual key. The current intensity is varied until a stimulation occurs. The disadvantage of these arrangements is in particular that the measurement of the brief pulses is difficult, and the known instruments are furthermore cumbersome.

The object of the present invention is to provide an electrodiagnostic apparatus facilitating the measurement of such parameters as faradic excitability, rheobase, chronaxie and accommodation threshold, and more particularly of the accommodation quotient.

Such instruments can be used for testing the electrical excitability of nerves and muscular fibers on human and animal bodies, for the detecting of "Pfluger's law", and for the testing of rheobase, chronaxie, accommodation threshold, effective time and the accommodation quotient.

In accordance with my present invention, an electrodiagnostic apparatus of this general description comprises a constant-current generator provided with adjusting means for varying the magnitude of its output current; this generator can be alternately pulsed in a sawtooth-wave mode and in a square-wave mode (as well as other modes, if desired) under the control of a mode selector. The magnitude of the output current selected for each test, with the aid of the adjusting means, can be read on an indicator which includes a stationary support carrying a logarithmic scale, a setting member displaceable relatively to this support and provided with a first marker, and a coacting member also displaceable — independently of the setting member — relatively to the support and provided with a second marker. The first marker, co-operating with the logarithmic scale, gives an accommodation-threshold reading when a patient is tested with the output current from the generator, operating in the sawtooth-wave mode; the second marker, also co-operating with that scale, gives a rheobase reading when the patient is tested in the square-wave mode. The two members, at least one of which is coupled with the adjusting means for entrainment thereby, respectively register the two readings. Thus, if only the setting member is coupled with the adjusting means, such as the slider of a potentiometer in series with the mode selector, the accommodation-threshold reading taken during a first test can be transferred to the coacting member by aligning the markers of the two members whereupon the setting member is again displaced by the adjusting means during rheobase measurement. Alternatively, the two members can be individually coupled to a pair of adjusting elements, such as the sliders of two potentiometers, used during rheobase and accommodation-threshold measurements, respectively.

According to an important feature of my invention, the setting member is provided with numerical indicia for giving an accommodation-quotient reading whenever the two members are positioned in the aforedescribed manner. Advantageously, these setting and coacting members are a first and a second disk coaxially mounted on the scale-bearing support, the numerical indicia for the accommodation-quotient reading being provided on a face of the second disk which has a window, constituting the third marker, exposing part of these indicia.

The constant-current generator can consist of an amplifier with differential inputs, commonly referred to as an operational amplifier. A voltage proportional to the output current is fed back to one amplifier input, while a comparison voltage modulated in one of the aforementioned modes is fed to the other amplifier input by way of a potentiometer serving as the adjusting means. Such an operational amplifier tends to keep the voltage difference between its two inputs as small as possible. In this way the feedback voltage which is proportional to the output current is approximately equal to the comparison voltage, provided that the output current obtained is dependent merely on the comparison voltage and the resistance network in the feedback path.

The operation of such an electrodiagnostic apparatus is as follows: the pulse width of the square-wave and sawtooth-wave voltages generated by the mode selector is set to one second, the pulses being separated by intervals of two seconds. Then the current which just brings about a muscular twitching in the sawtooth mode is determined. With the setting disk stationary, the window on the coacting disk moves during the repositioning thereof over a path whose logarithmic length corresponds to the magnitude of the current. Thereupon the selector is switched to the square-wave mode for determination of the output current which just brings about a twitching of the muscle. The square-wave current is as a rule smaller than the sawtooth-wave current. The displacement of the setting disk in conformity with this square-wave current causes its indicia to pass below the window of the coacting disk to an extent which corresponds to the intensity of the current. The quotient indicia are so distributed that below the window the difference of the logarithms of the two test currents appears, this difference representing the magnitude of the first current divided by the magnitude of the second current.

In order to determine the chronaxie, the feedback resistance of the operational amplifier is halved by a changing switch. In order to maintain the equilibrium condition in the operational amplifier, the latter must now deliver twice the current. In this way it is possible for all parameters, with the exception of the effective time, to be read off from the instrument at the end of the measurement. By this instrument, therefore, the measurement is simplified, and performing calculations or taking notes during the measurement becomes unnecessary. With the use of a constant-current generator, the current which flows is independent of the body resistance of the patient. Therefore no additional current measurement is required. This, however, is true only within certain limits, namely up to a saturation range which is determined by the supply voltage. In order to avoid errors due to excessive body resistance of the patient, I prefer to provide at the output of the constant-current generator an overvoltage indicator which responds when a predetermined voltage has been reached. The indication can be effected optically or acoustically.

With these and other objects in view, which will become apparent in the following detailed description, the present invention will be clearly understood in connection with the accompanying drawings in which:

FIG. 1 is a circuit diagram of an apparatus for testing galvanic and faradic excitability and for the determination of the rheobase, the chronaxie and the accommodation quotient in accordance with my invention;

FIG. 2 is a partial circuit diagram of a modified apparatus having two potentiometers; and FIG. 3 is a circuit diagram of a simplified apparatus suitable for testing galvanic and faradic excitability.

Figures 1, 2, 3:
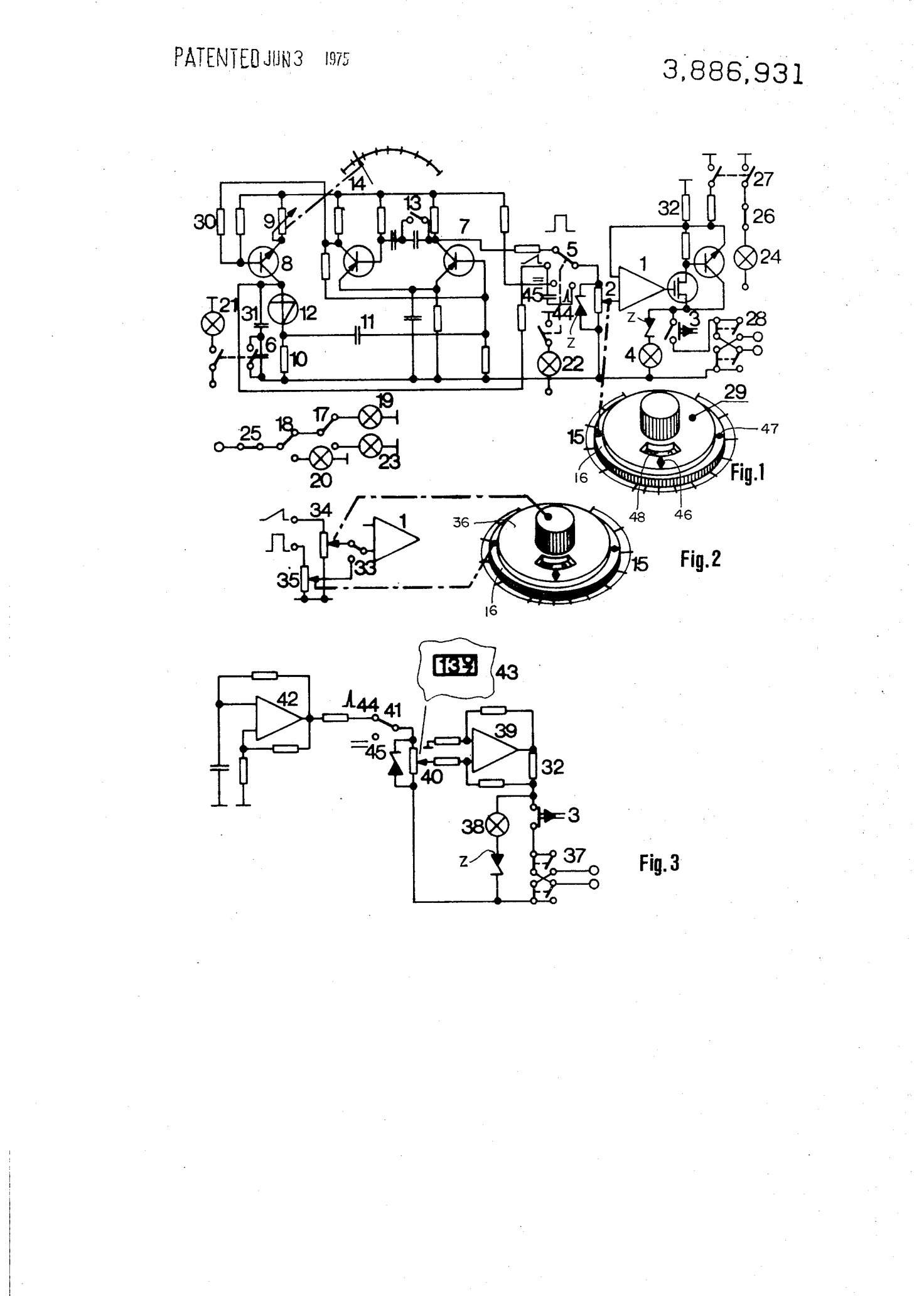

As shown in FIG. 1, a constant-current generator 1 in the form of an operational amplifier whose differential inputs receive, on the one hand, a current-dependent voltage via a resistive feedback circuit 32 and, on the other hand, a control voltage from a potentiometer 2. An indicating device 15 carries a logarithmic scale and includes a setting disk 16 which is coupled with the slider of potentiometer 2.

Via a selector switch 5, a square-wave voltage, a sawtooth voltage, a d-c voltage or a pulsed voltage can be connected across potentiometer 2. An overvoltage indicator 4 is provided at the output of the constant-current generator 1 and consists of a zener diode connected in series with a light-emitting diode. A pushbutton 3 serves to turn on the current whose polarity can be changed by a reversing switch 28.

With scale 15 calibrated in output-current values, the output-current intensity can be read off directly from this scale, the LED 14 lighting up in case of an excessive body resistance of the patient, this indicating an incorrect measurement. The pulsed voltage and the sawtooth voltage are produced by a trigger circuit containing a zener diode 12, a charging transistor 8 for a capacitor 31, a pulse-width regulator 9 which is coupled with a pulse-width indicator 14, and a monostable multivibrator 7. By means of a resistor 10, the descending flank of the sawtooth oscillation occurring upon the discharge of the capacitor can be delayed. The operation is as follows:

The controller 9 and the transistor 8 act in this circuit as a constant-current source and slowly charge the capacitor 31. After reaching the trigger voltage of the zener diode 12, this capacitor is discharged via the resistor 10 and, by means of a differentiation network 11, triggers the monostable multivibrator 7. The latter flops over and via a resistor 30 prevents the charging of the capacitor 31 during this switching phase by blocking the transistor 8. After about two seconds, the multivibrator returns to its normal state and now restarts the charging of the capacitor 31. By turning the potentiometer 9, this charging time can be changed as indicated on a scale 14.

In this way there is generated the rising flank of a sawtooth voltage which is fed to a bank contact of switch 5. At the same time, the state of the multivibrator 7 can also be used to produce a square pulse fed to another bank contact of switch 5.

Two bypass switches 13 and 6 allow the operating cycles of the two oscillation generators to be reduced, switch 6 also making available a pulsating current for the faradic testing. In order that the several measurements be indicated optically, small bulbs are provided which illuminate corresponding signs. The bulb 19 lights a sign "rheobase," the bulb 20 lights a sign "accommodation threshold," and lamps 21, 22, 23, 24 light respective signs reading "faradic," "galvanic," "effective time", and "chronaxie." In order that the bulbs light up only upon the corresponding measurement, they are provided with suitably interconnected changeover switches 17, 18, 25, 26 some of which are coupled with the potentiometer 9 and with the selector switch 5. These connections, not shown in detail, are such that lamp 19 (rheobase) will only light up if the potentiometer 9 is set at one second and the switch 5 is in position "square wave"; lamp 20 (accommodation threshold) lights up only if potentiometer 9 is set at one second and switch 5 is in position "sawtooth wave"; lamp 23 (effective time) lights up when the potentiometer 9 is turned to less than one second and switch 5 is in position square wave; lamp 24 (chronaxie) lights up when the potentiometer 9 is turned to less than one second and the switch 27 is simultaneously shifted to a position in which the resistance of feedback circuit 32 is halved so as to double the output current.

The measurement process now proceeds as follows:

Switch 5 is set to sawtooth-wave position and potentiometer 9 to one second.

Accommodation-threshold measurement: The current is adjusted to the excitation value by means of the setting disk 16, coacting with scale 15, and potentiometer 2, whereupon a mark 46 on an overlying coacting disk 29, which is independently rotatable, is placed over a mark 47 of the setting disk 16 co-operating with the scale 15. Thereafter, the switch 5 is turned to square wave.

Rheobase measurement: The corresponding current value is chosen by disk 16 as read on the scale 15; in a window 48 of the disk 29 there now appears the accommodation quotient which results from dividing the rheobase reading into the established accommodation threshold. The potentiometer 9 is now set to smaller pulse widths until excitation ceases.

Effective-time measurement: On scale 14 the pulse width is read as the "on" period, changeover switch 27 being placed in "double current" position. Chronaxie measurement: The potentiometer 9 is turned to smaller pulse widths until excitation ceases. The pulse width now appearing on scale 14 is the chronaxie. During these measurements, the pushbutton switch 3 is short-circuited. By means of switch 28, the polarity of the electrodes can be changed. On turning the switch 5 to position 44, with the switches 13 and 6 open, there is produced a pulsating current having a frequency of about 50 cycles per second.

Testing of faradic excitability: Pushbutton switch 3 is short-circuited and the current intensity can be adjusted to the onset of excitation by means of the potentiometer 2 and the rotary disk 16. The current intensity is read off from the scale 15. On switching to position 45, the potentiometer 2 is energized with d-c voltage; with removal of the short circuit, depressing the pushbutton 3 generates current pulses which serve to test the galvanic-stimulation threshold.

FIG. 2 shows an apparatus wherein the constant-current generator 1 of FIG. 1 is alternately connectable, through a changeover switch 33, to the sliders of two potentiometers 34 and 35 which are coupled with setting and coacting disks 16 and 36, respectively, associated with the logarithmic current scale 15. The measurement is effected in the same manner as in the circuit of FIG. 1, with sawtooth and square-wave voltages respectively applied to potentiometers 34 and 35.

In FIG. 3 I have shown a simpler arrangement which serves merely for galvanic and faradic stimulation testing. A constant-current generator 39 has a current-dependent feedback resistor 32 in series with an overvoltage indicator consisting of an LED 38 and a zener diode in series therewith. This indicator is shunted, like the corresponding circuit 4 of FIG. 1, by a reversing switch 37 in series with pushbutton 3. The slider of a potentiometer 40, replacing component 2 of FIG. 1, is coupled with a digital indicator 43. By means of a switch 41, a pulsating current from a generator 41, in position 44, or a d-c voltage, in position 45, can be alternately applied to potentiometer 40.

Since the apparatus supplies corresponding current intensities, it can, of course, also be used for electrotherapy.

While I have disclosed several embodiments of the present invention, it is to be understood that these embodiments are given by way of example only, and not in a limiting sense.

I claim:

1. An electrodiagnostic apparatus comprising:
   constant-current-generating means provided with adjusting means for varying the magnitude of the output current thereof;
   mode-selector means connected to said constant-current-generator means for alternately positioning same in a sawtooth-wave mode and in a square-wave mode; and
   indicator means including a stationary support carrying a logarithmic scale, a setting member displaceable relatively to said support and provided with first marking means co-operating with said scale to give an accommodation-threshold reading upon a testing of a patient with said output current in said sawtooth-wave mode, and a coacting member displaceable relatively to said support independently of said setting member and provided with second marking means co-operating with said scale to give a rheobase reading upon a testing of a patient with said output current in said square-wave mode, at least one of said members being coupled with said adjusting means for entrainment thereby, said setting member being further provided with numerical indicia and said coacting member being further provided with third marking means co-operating with said indicia for giving an accommodation-quotient reading upon displacement of said members into positions respectively determined by said adjusting means during rheobase and accommodation-threshold measurements.

2. An apparatus as defined in claim 1 wherein said setting and coacting members are a first disk and a second disk mounted on said support for rotation about a common axis, said numerical indicia being provided on a face of said first disk overlain by said second disk, said third marking means being a window on said second disk exposing part of said indicia.

3. An apparatus as defined in claim 1 wherein said constant-current-generating means comprises an operational amplifier provided with a pair of differential inputs and with a resistive feedback connection to one of said inputs, said mode-selector means being connected to the other of said inputs.

4. An apparatus as defined in claim 3 wherein said adjusting means comprises a potentiometer in series with said mode-selector means having a slider connected to said other of said inputs, said slider being coupled with said setting member for entraining same.

5. An apparatus as defined in claim 3 wherein said adjusting means comprises a first potentiometer and a second potentiometer, said first potentiometer having a first slider coupled with said setting member for entraining same, said second potentiometer having a second slider coupled with said coacting member for entraining same, said mode-selector means including a source of sawtooth voltage connected to said first potentiometer, a source of square-wave voltage connected to said second potentiometer and switchover means for alternately connecting said sliders to said other of said inputs.

6. An apparatus as defined in claim 3 wherein said feedback connection is provided with switch means for halving the resistance thereof to provide a chronaxie reading on said first marking means.

7. An apparatus as defined in claim 3, further comprising overvoltage-indicating means connected to the output of said amplifier.

* * * * *